UNITED STATES PATENT OFFICE.

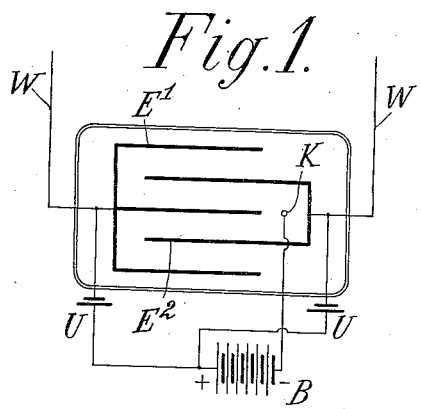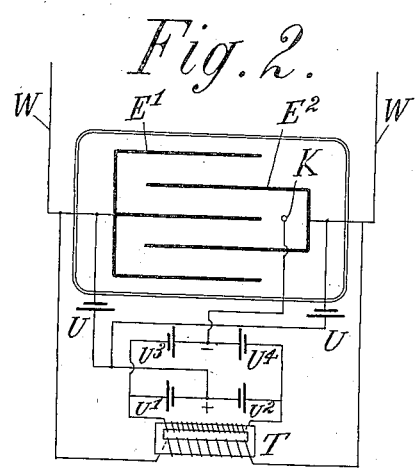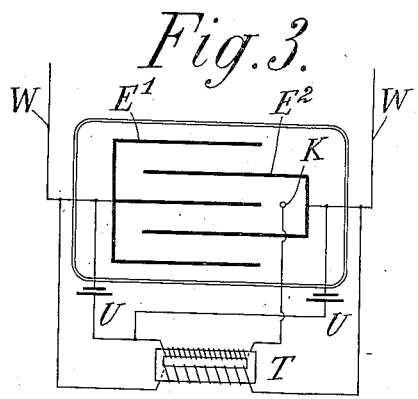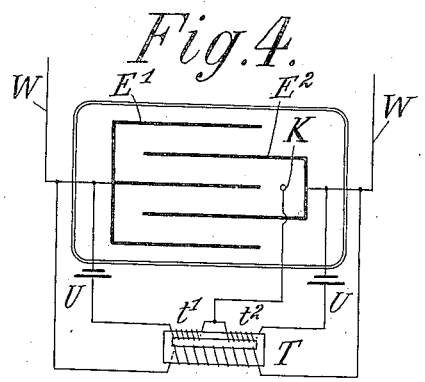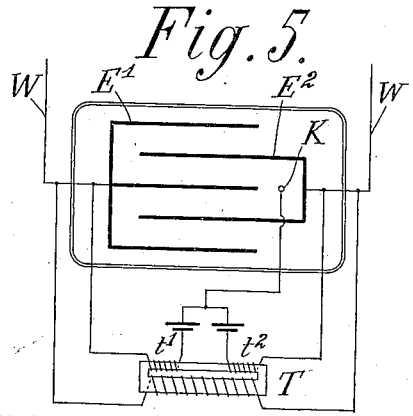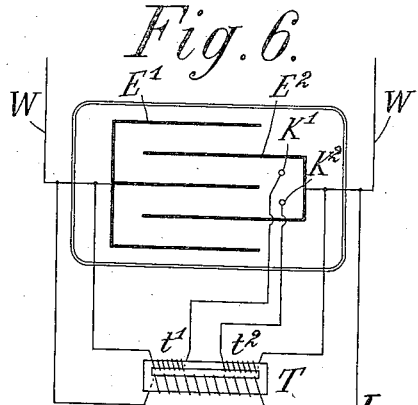

IGNACY MOSCICKI, OF GAMBACH, NEAR FRIBOURG, SWITZERLAND.

ELECTROLYTE-CONDENSER.

No. 926,128.　　　　Specification of Letters Patent.　　　Patented June 29, 1909.

Application filed October 29, 1907. Serial No. 399,771.

*To all whom it may concern:*

Be it known that I, IGNACY MOSCICKI, electrical chemist, citizen of Russia, residing at Gambach, near Fribourg, in the Confederation of Switzerland, have invented certain new and useful Improvements in Electrolyte-Condensers; and I do hereby declare the following to be a full, clear, and exact description of the invention, such as will enable others skilled in the art to which it appertains to make and use the same.

By a suitable formation of aluminum electrodes as anodes with direct current, the result can be obtained that aluminum electrolyte cells have very great efficiency as condensers though only at the beginning. But with long use with alternating currents, the losses increase continuously until the aluminum condenser reaches a stage where it works with the same efficiency as if it had been formed only with the operating alternating current. With the increase of loss, however, the resistance to perforation of the aluminum oxid strata (as a dielectric) is also reduced. The use of such aluminum electrolyte cells as condensers, in their present form, is also on account of their great energy loss completely excluded for technical purposes.

By the present invention, now, it is attained that the aluminum electrolyte condenser works continuously under constant operation with the same good efficiency which it shows at the beginning after suitable formation with direct current.

In the accompanying drawings, are shown diagrammatically as examples of the invention, several embodiments of the same.

The two aluminum electrodes $E^1$ $E^2$, Figure 1, are dipped into a suitable electrolyte and connected to the alternating current circuit W, W so that they act as condensers. Direct current being received from the battery, B, is led on the one side with its positive pole through the two very small rectifiers U to the two groups of aluminum plates $E^1$ $E^2$, while the negative pole of the source of direct current is connected directly with an auxiliary electrode K, whose small outer surface dips into the electrolyte in the aluminum cells. The two small rectifying cells (electrolytic valves) U prevent the short circuit of the alternating current between the two condenser systems $E^1$ $E^2$ and allow the passage of the current in the direction from the positive pole of the direct current source to the aluminum electrode $E^1$ and $E^2$ of the condenser but not in the reverse direction. In this way, the result is attained that direct current flows continuously to the aluminum plates as an anode, whereby the formation of the aluminum oxid strata is retained also in alternating current operation, so that the great efficiency obtained through the formation is retained during continuous action.

In cases, when one cannot count on the possibility of employing a direct current source of high voltage, the latter can be replaced by a rectified alternating current in the manner illustrated in the embodiment of the invention shown in Fig. 2. The rectifier group consisting of four small rectifiers $U^1$, $U^2$, $U^3$, $U^4$, Fig. 2, is connected with its positive direct current pole, in a similar way as the direct current source before, to the aluminum plates $E^1$ $E^2$ of the condensers, the two small rectifiers U being interpolated in the circuit. The direct current negative pole is connected directly with the auxiliary electrode K as before. The rectifier group $U^1$, $U^2$, $U^3$, $U^4$ is connected to the secondary winding of the small transformer T whose primary winding is included in the same alternate current circuit W. W as is the condenser. In case an independent alternating current is employed for feeding the rectifier group, the transformer T can be omitted and the rectifier group may be connected directly with the second source of alternating current. The rectifier group $U^1$–$U^4$ mentioned in connection with Fig. 2 can also be omitted, for, in principle, it suffices, as is shown for example in Fig. 3, to connect the secondary winding of the transformer T directly with the auxiliary electrode K, while the other pole is connected to the aluminum electrodes $E^1$, $E^2$, the two rectifiers U being interpolated in the circuit.

In practice, the employment of a double secondary winding for the transformer has proven particularly advantageous this modification being shown in Figs. 4 to 6. In the condenser shown in Fig. 4, the two secondary windings $t^1$ $t^2$ are arranged in series. The common point of the two windings is directly connected with the auxiliary electrode K while of the other ends, one of each of the two windings is so connected with the respective aluminum electrode of the conductor through a rectifier U that current can flow only in the direction from the transformer through the rectifier to the aluminum electrode then to the auxiliary electrode K and from there back to the transformer but not in the reverse direction. Instead of connecting the rectifiers U, in the two connecting circuits of the two aluminum electrodes, with the corresponding ends of the two secondary windings, the other ends of the secondary windings can be connected singly with the auxiliary electrode K, each through a rectifier U as in the modification illustrated in Fig. 5, while the aluminum electrodes $E^1$ $E^2$ of the condensers are each connected separately with the respective other ends of the two secondary windings $t^1$ $t^2$ of the transformer. The rectifiers U are again so introduced that the current flow can take place only in the direction hereinbefore stated, through this formation circuit, that is, the aluminum electrodes are always the anodes in the formation circuit, because the rectifier U must always prevent the discharge of the transformer in the other direction.

In Fig. 6, the two rectifiers U of Fig. 5 are so arranged that each one of the two connections leading from $t^1$ $t^2$ are connected separately to corresponding auxiliary electrodes K and $K^2$. These auxiliary electrodes are in this case necessarily made from aluminum, in order that they may serve in place of rectifiers. Also in the modification according to Figs. 4 and 5, separated auxiliary electrodes of aluminum may be employed. Obviously, instead of single aluminum electrodes, groups of electrodes can be used and also the hereinbefore described different modifications may be combined.

Having thus described my invention, what I claim is:

1. In an electrolyte condenser, the combination, with aluminum electrodes immersed in an electrolyte, and an alternating current working circuit in which said electrodes are included, of means for causing a flow of unidirectional current through the aluminum electrodes as anodes.

2. In an electrolyte condenser, the combination, with aluminum electrodes immersed in an electrolyte, and a working circuit in which said electrodes are included, of an auxiliary circuit to which said electrodes are connected as anodes, and means in said auxiliary circuit for supplying a unidirectional current to said electrodes.

3. In an electrolyte condenser, the combination, with aluminum electrodes immersed in an electrolyte, and an alternating current working circuit in which said electrodes are included, of an auxiliary circuit to which said electrodes are connected as anodes, means in said circuit for causing a flow of unidirectional current to said electrodes, and means for preventing the short circuiting of the working circuit on said auxiliary circuit.

4. In an electrolyte condenser, the combination, with aluminum electrodes, immersed in an electrolyte, and an alternating current working circuit in which said electrodes are included, of means for supplying a unidirectional current to one pole of which both electrodes are connected, and an auxiliary electrode in circuit with the aluminum electrodes and connected to the other pole of the said means for supplying unidirectional current.

5. In an electrolyte condenser, the combination, with aluminum electrodes immersed in an electrolyte, and an alternating current working circuit in which said electrodes are included, of a transformer having its primary included in the working circuit, the electrodes being connected as anodes to the secondary of said transformer, an auxiliary electrode in circuit with the aluminum electrodes and connected to the transformer secondary as a cathode, and means for rectifying the current supplied from the secondary to the aluminum electrodes.

6. In an electrolyte condenser, the combination, with aluminum electrodes immersed in an electrolyte, of means for energizing said electrodes with both an alternating and a unidirectional current.

In testimony whereof I hereunto affix my signature in the presence of two witnesses.

IGNACY MOSCICKI.

Witnesses:
FRIEDRICH NAEGELI,
FRIEDRICH LUTZ.